US008203554B2

(12) United States Patent
Chen et al.

(10) Patent No.: US 8,203,554 B2
(45) Date of Patent: Jun. 19, 2012

(54) METHOD AND APPARATUS FOR IDENTIFYING VISUAL CONTENT FOREGROUNDS

(75) Inventors: Jiann-jone Chen, Taipei (TW); Chun-rong Su, Taipei (TW); Chun-hao Lien, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 449 days.

(21) Appl. No.: 12/502,631

(22) Filed: Jul. 14, 2009

(65) Prior Publication Data
US 2010/0045663 A1    Feb. 25, 2010

(30) Foreign Application Priority Data

Aug. 25, 2008   (TW) ................ 97132384 A (51) Int. Cl.
*G06T 15/00*    (2006.01)
*G06K 9/00*    (2006.01)
*G06K 9/34*    (2006.01)
(52) U.S. Cl. ......... 345/419; 382/162; 382/173; 382/181
(58) Field of Classification Search .............. None
See application file for complete search history.

(56) References Cited

U.S. PATENT DOCUMENTS
2004/0076335 A1 *  4/2004  Kim ............................ 382/257

OTHER PUBLICATIONS

Serra et al., An Overview of Morphological Filtering, Jan. 1992, Circuits Systems and Signal Processing, vol. 11, No. 1, pp. 47-108.*
Mukhopadhyay et al., Morphological Segmentation of Gray-Scale Images, May 2003, IEEE Transactions on Image Processing, vol. 12, No. 5, pp. 533-549.*

* cited by examiner

*Primary Examiner* — Xiao M. Wu
*Assistant Examiner* — Matthew D Salvucci (57) ABSTRACT

A method and apparatus for identifying visual content foregrounds, the method comprises steps of: determining a 3-D opening-by-reconstruction modest structure element ($B_O$) and a 3-D closing-by-reconstruction modest structure element ($B_C$); comparing an original image with an image obtained by performing MSOR operation to the original image with $B_O$ and an image obtained by performing MSCR operation to the original image with $B_C$ so as to generate an enhanced top-hat image and an enhanced bottom-hat image; and locating an overlap region between the enhanced top-hat image and the enhanced bottom-hat image. The overlap region forms a foreground identifying screen which is capable of identifying and extracting—refined for obtaining delicate foregrounds.

12 Claims, 8 Drawing Sheets

METHOD AND APPARATUS FOR IDENTIFYING VISUAL CONTENT FOREGROUNDS

TECHNICAL FIELD OF THE INVENTION

The present invention relates to a method and apparatus for video image content retrieval, and more particularly, to a method and apparatus for identifying foregrounds of visual content.

BACKGROUND OF THE INVENTION

Content-based similarity retrieval for multimedia data becomes important after international coding standards were established, such as JPEG, MPEG-1, MPEG-2, and MPEG-4, which have been widely used over the Internet. In general, one image can express than words. When performing similarity retrieval for multimedia databases, the retrieval result would depend on user's definition on image similarity. For a content-based image retrieval system, the retrieval performance would be affected by the result of image segmentation. In general, if features extracted from the entire image include trivial background information, it would bias the retrieval result.

Concerning image pre-processing, good retrieval performances can be achieved only when the key subject of visual contents is precisely specified. For example, shape descriptors should be applied to descriptions of the shape of meaningful objects instead of blind descriptions of the entire image.

Mathematical morphology is a set-theoretically method for image processing. It is a powerful tool and it can be employed in removing backgrounds or extracting foregrounds of visual content. Some basic morphological operations, such as erosion, dilation, opening, and closing, will be introduced as follows.

Dilation and erosion of a gray-level image I(x, y) by a two dimensional structure element (SE) B (for example, a disk or square) are respectively defined as $$(I[+]B)(x,y)=\max\{I(x-k, y-l)|(k,l)\in B\} \quad (1)$$

$$(I[-]B)(x,y)=\min\{I(x+k, y+l)|(k,l)\in B\} \quad (2)$$

where [+] and [−] are dilation and erosion operators respectively. When performing dilation and erosion operations to an image by using a structure element in the shape of a circular disk, it looks like the circular disk moves around the boundary between foreground areas and background areas. The circular disk broadens or reduces the boundary corresponding to dilation or erosion operations.

Figure 1A:
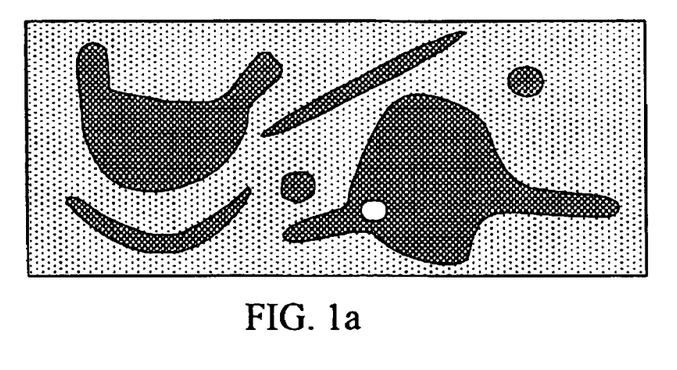
FIG. 1a shows an original image I.
Figure 1B:
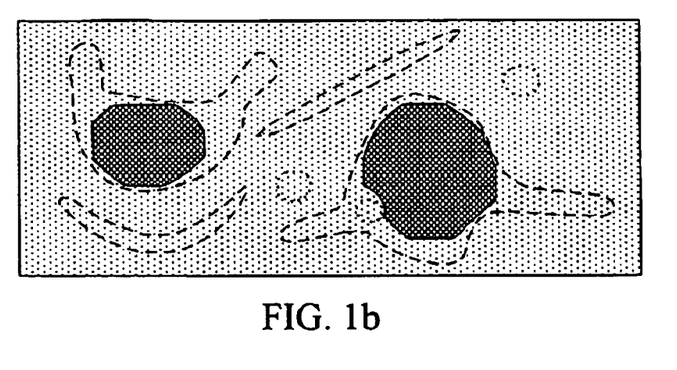
FIG. 1b shows an image, denoted as $I_B^O$, which is obtained by performing opening operation to the original image I.

Opening operation is accomplished by performing erosion and then dilation; closing operation is accomplished by performing dilation and then erosion. Opening and closing operations for a gray-level image I are respectively defined as $$I \circ B = (I[-]B)[+]B \quad (3)$$

$$I \bullet B = (I[+]B)[-]B \quad (4)$$

where ○ and ● are opening and closing operators respectively. Opening operation smoothes the contours of an object and removes thin protrusions; closing operation generally fuses narrow breaks, and fills long thin gulfs and small holes. Please refer to FIGS. 1a and 1b, where FIG. 1a shows an original image I and FIG. 1b shows an image, denoted as $I_B^O$, which is obtained by performing opening operation to the original image I.

However, conventional opening and closing operations can not preserve the boundary information between foreground areas and background areas on an image. For identifying visual content foregrounds, there exist drawbacks when processing images by utilizing conventional morphology.

SUMMARY OF THE INVENTION

The present invention performs multi-scale opening and closing by reconstruction (MSOR and MSCR) with a three-dimensional (3-D) structure element to an image which is realized as position (x,y) and pixel value in three-dimensional space. In contrast, conventional morphology performs opening and closing operations with a two-dimensional (2-D) structure element to an image which is realized as position (x,y) in two-dimensional space. For image segmentation, the present invention can precisely process the boundary between foreground areas and background areas, and can preserve the boundary information as well.

The present invention performs MSOR and MSCR operations to an image for identifying visual content foregrounds. The present invention provides a foreground identification method and an apparatus implementing the same. The method comprises steps of: (a) respectively performing MSOR and MSCR operations to an original image by using plural values of 3-D structure element for determining a 3-D opening-by-reconstruction modest structure element and a 3-D closing-by-reconstruction modest structure element; (b) comparing the original image and an image obtained by performing MSOR operation with the 3-D opening-by-reconstruction modest structure element to the original image so as to generate an enhanced top-hat image, and comparing the original image and an image obtained by performing MSCR operation with the 3-D closing-by-reconstruction modest structure element to the original image so as to generate an enhanced bottom-hat image; (c) locating an overlap region between the enhanced top-hat image and the enhanced bottom-hat image, where the overlap region forms a foreground identification screen; (d) simulating the variation of pixel colors in background areas extracted by the foreground identification screen for generating an interpolated background mesh; (e) dividing the original image into a plurality of regions and indexing the plural regions so that an image with indexed regions is obtained; (f) comparing the interpolated background mesh and the image with indexed regions for determining a refined foreground identification screen according to a refinement calculation; and (g) identifying and extracting foregrounds from the original image by utilizing the refined foreground identification screen. The foreground identification apparatus comprises modules that their functions respectively correspond to the steps (a)-(g).

DETAILED DESCRIPTION OF THE INVENTION

Two operations, multi-scale opening and closing operations, will be introduced as follows. The multi-scale opening and closing operations for an image I by structure element (SE) B are respectively defined as $$I \circ nB = (I[-]nB)[+]nB \quad (5)$$

$$I \bullet nB = (I[+]nB)[-]nB \quad (6)$$

where n is an integer, represented as a scaling factor. Equation (5) can be implemented as $$I \cdot nB = \underbrace{\{(I[-]B)[-]B \ldots [-]B\}}_{n \text{ times}}\underbrace{[+]B[+]B \ldots [+]B}_{n \text{ times}}. \quad (7)$$

Likewise for I●nB. In addition, n-scale opening (closing) operation is equivalent to that performing opening (closing) operation by using a structure element of n-times size, i.e. nB. For example, 2-scale opening operation is equivalent to that performing opening operation by using a structure element of 2-times size, i.e. 2B.

Two operations, multi-scale opening and closing by reconstruction (MSOR and MSCR) will be introduced as bellow. MSOR operation is defined as $$I_B^{OR} = (I\tilde{\circ}nB) = \delta_B^{m+1}(I \circ nB, I) = \min(\delta_B^m(I \circ nB, I)[+]nB, I) \quad (8)$$

where m is an integer, represented the number of times that reconstruction is to be performed, $\delta_B^1 = \min((I \circ nB)[+]nB, I)$, and n is also an integer, represented as a scaling factor. Similarly, MSCR operation is defined as $$I_B^{CR} = (I\tilde{\bullet}nB) = \epsilon_B^{m+1}(I \bullet nB, I) = \max(\epsilon_B^m(I \bullet nB, I)[-]nB, I) \quad (9)$$

where m is an integer, represented the number of times that reconstruction is to be performed, $\epsilon_B^1 = \max((I \bullet nB)[-]nB, I)$, and n is also an integer, represented as a scaling factor.

Figure 1C:
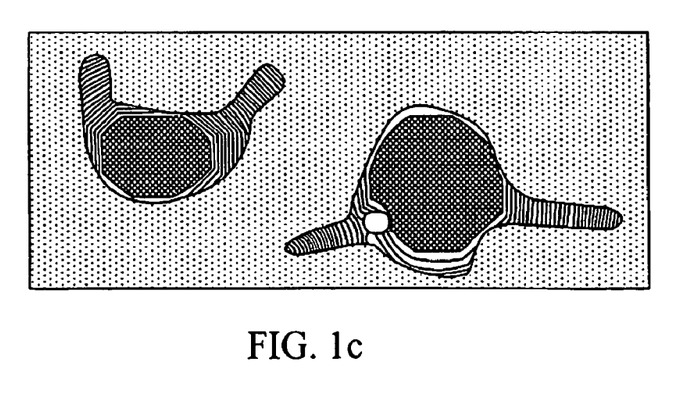
FIG. 1c illustrates processes of performing MSOR operation to the original image I, where images generated correspondingly are denoted as $I_B^{OR}$.
Figure 1D:
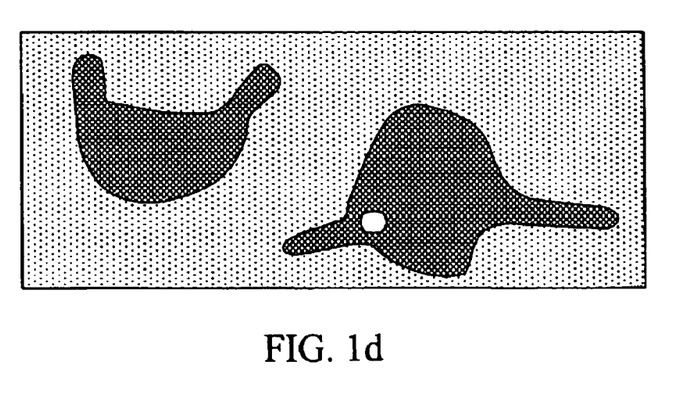
FIG. 1d shows an image, denoted as $I^{OR}$, which is obtained by performing MSOR operation to the original image I.

MSOR and MSCR operations can preserve the boundary information between foreground areas and background areas on an image. Please refer to FIGS. 1c and 1d. FIG. 1c illustrates processes of performing MSOR operation to the original image I shown in FIG. 1a, where images generated correspondingly are denoted as $I_B^{OR}$. FIG. 1d shows an image, denoted as $I^{OR}$, which is obtained by performing MSOR operation to the original image I shown in FIG. 1a.

Figure 2A:
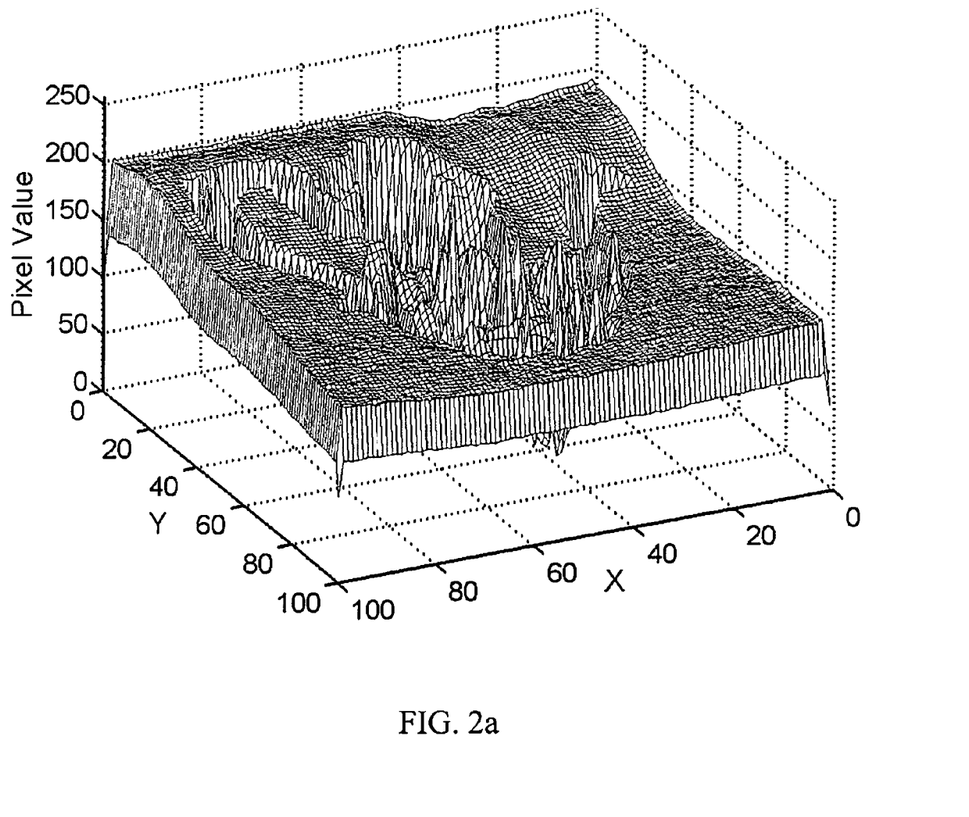
FIG. 2a illustrates an image realized as position (x,y) and pixel value in a three-dimensional space.
Figure 2B:
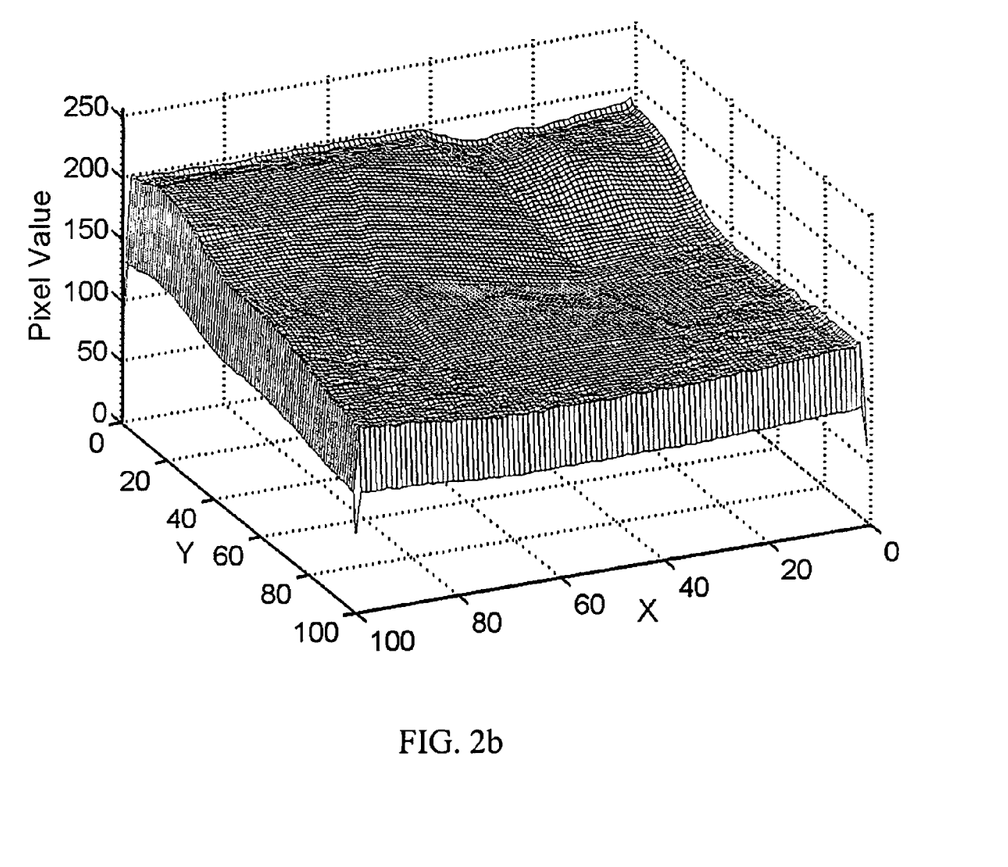
FIG. 2b shows a gray-level background mesh generated after performing MSOR and MSCR operations to an image.

When performing MSOR and MSCR operations to an image by using a three-dimensional (3-D) structure element (such as a ball), it looks like the ball rolls in a three-dimensional space consisted of position (x,y) and pixel value (as shown in FIG. 2a). It is similar to that the ball rolls among mountain peaks and valleys. When performing MSOR and MSCR operations by using a ball with enough volume, the ball would level the mountain peaks to the ground and fill valleys. That is, foreground areas on the image are removed and a gray-level background mesh (as shown in FIG. 2b) is thus generated. In addition, MSOR and MSCR operations are applicable for identifying foregrounds of visual content.

Figure 3:
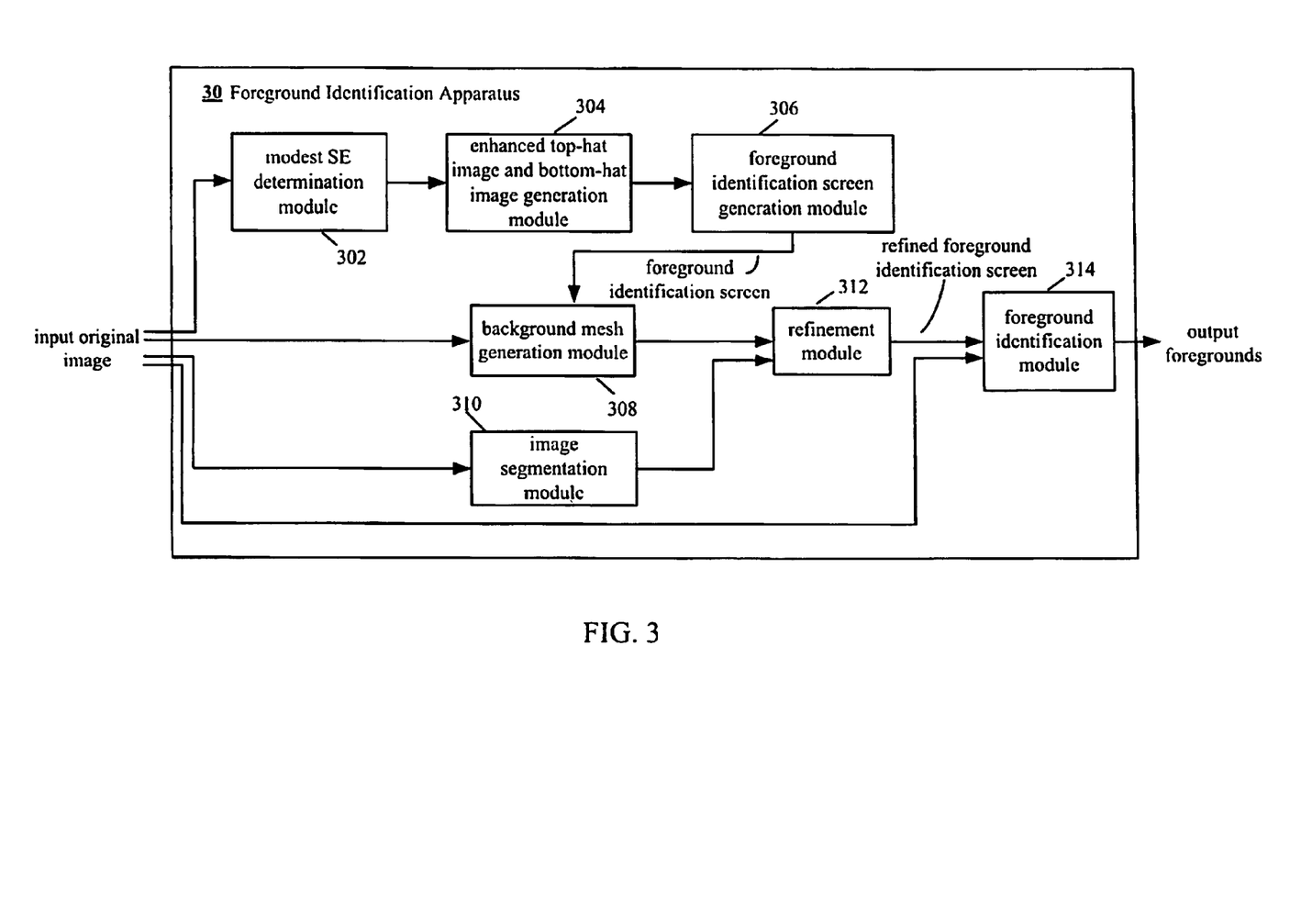
FIG. 3 is a block diagram showing a foreground identification apparatus according to the present invention
Figure 4:
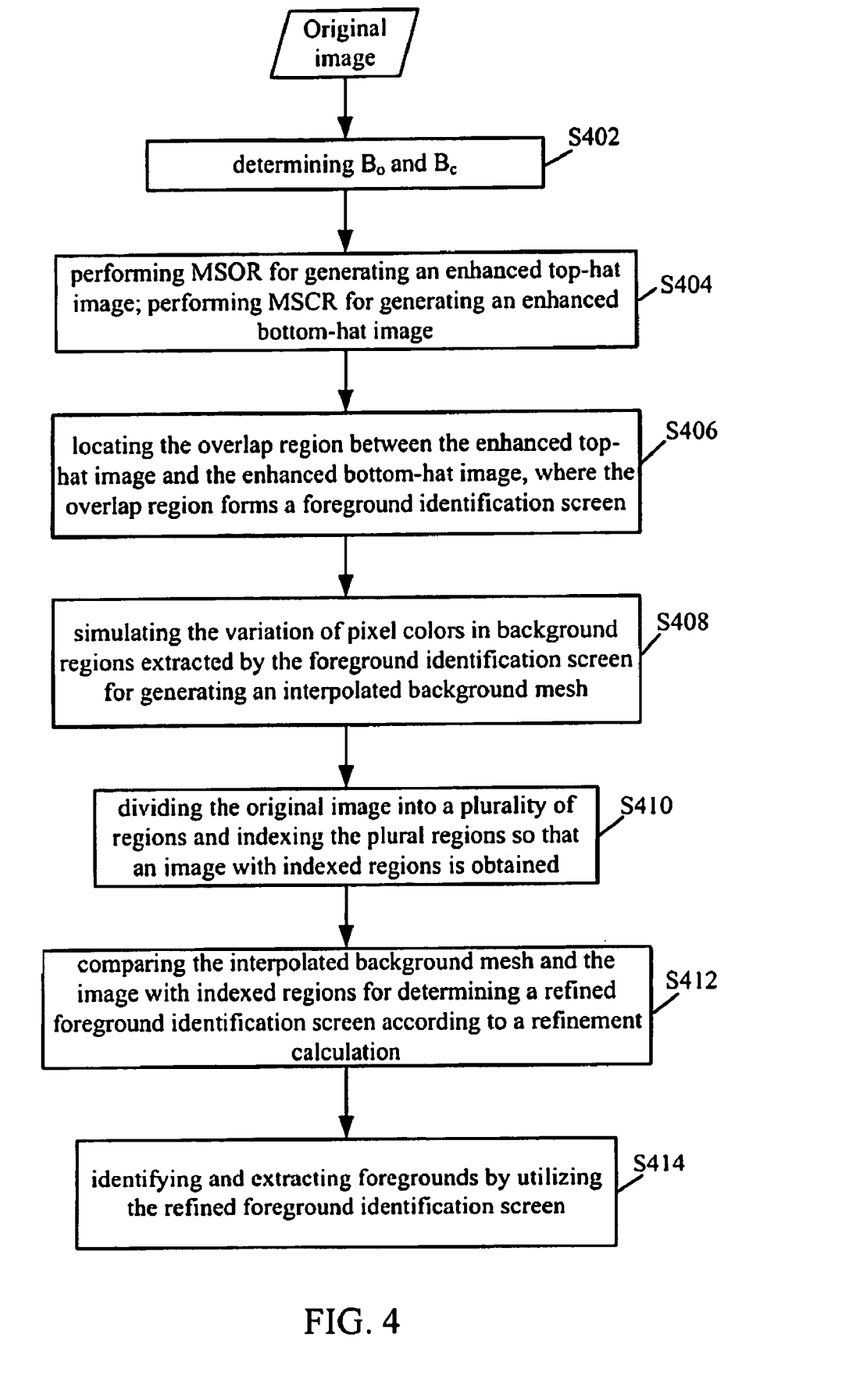
FIG. 4 is a flow chart showing a foreground identification method according to the present invention.

Please refer to FIGS. 3 and 4. FIG. 3 is a block diagram showing a foreground identification apparatus according to the present invention. FIG. 4 is a flow chart showing a foreground identification method according to the present invention. In FIG. 3, the foreground identification apparatus, labeled as 30, is capable of identifying foregrounds on an original image and outputting the identified foregrounds. The foreground identification apparatus 30 comprises a modest structure element (SE) determination module 302, an enhanced top-hat image and bottom-hat image generation module 304, a foreground identification screen generation module 306, a background mesh generation module 308, an image segmentation module 310, a refinement module 312, and a foreground identification module 314. In the following paragraph, the present invention will be described in referring to FIG. 3 also with the flow chart of FIG. 4.

In Step S402, the modest SE determination module 302 receives an inputted original image, for example, an image which has an obvious key object and background. In the beginning, the original image is processed by performing MSOR (MSCR) operation with a value of three-dimensional (3-D) structure element. The value of 3-D structure element is increased gradually. An increased value of 3-D structure element is used for performing MSOR (MSCR) operation to the original image. If no change would occur after performing MSOR operation to the original image by using the increased value of 3-D structure element, a 3-D opening-by-reconstruction modest structure element, denoted as $B_O$, is determined. If no change would occur after performing MSCR to the original image by using the increased value of 3-D structure element, a 3-D closing-by-reconstruction modest structure element, denoted as $B_C$, is determined.

In Step S404, the enhanced top-hat image and bottom-hat image generation module 304 receives $B_O$ and $B_C$ which are determined by the modest SE determination module 302. MSOR operation is performed to the original image by using $B_O$; MSCR operation is performed to the original image by using $B_C$. The original image and an image obtained by performing MSOR operation with $B_O$ are compared so as to generate an enhanced top-hat image; the original image and an image obtained by performing MSCR operation with $B_C$ are compared so as to generate an enhanced bottom-hat image. An example of aforesaid comparison is to calculate the pixel value difference between the two images, the original image and the image obtained by performing MSOR (or MSCR).

In Step S406, the foreground identification screen generation module 306 receives the enhanced top-hat image and the enhanced bottom-hat image which are generated by the enhanced top-hat image and bottom-hat image generation module 304. The foreground identification screen generation module 306 locates an overlap region between the enhanced top-hat image and the enhanced bottom-hat image. The present invention takes the overlap region as a foreground identification screen, which is capable of identifying and extracting foregrounds from the original image. In the present invention, the foreground identification screen is refined for obtaining delicate foregrounds. The refinement will be described as follows.

In Step S408, the background mesh generation module 308 receives the original image and the foreground identification screen which is generated by the foreground identification screen generation module 306. In the beginning, the foreground identification screen is transformed into a background identification screen. Taking a two-value foreground identification screen (each pixel value is 1 or 0) for example, during transformation, those original pixels of value "1" are replaced with value "0" and those original pixels of value "0" are replaced with value "1". The background identification screen is utilized for extracting the background of original image. After that, the background mesh generation module 308 simulates the variation of pixel colors in the extracted background areas for generating an interpolated background mesh.

In Step S410, the image segmentation module 310 receives the original image, divides the original image into a plurality of regions and indexing the plural regions so that an image with indexed regions is obtained. A pixel, a square block consisted of plural pixels, or an arbitrary shaped region can be utilized as a single region afore mentioned.

In Step S412, the refinement module 312 receives the image with indexed regions from the image segmentation module 310 and the interpolated background mesh from the background mesh generation module 308. The refinement module 312 compares the image with indexed regions and the interpolated background mesh for determining a refined foreground identification screen according to a refinement calculation.

In Step S414, the foreground identification module 314 receives the refined foreground identification screen from the refinement module 312 and the original image. The foreground extraction module 314 identifies and extracts foregrounds from the original image by using the refined foreground identification screen.

By the above-mentioned steps (Step S402 to S414), foregrounds on the original image are thus identified and outputted.

Figure 5:
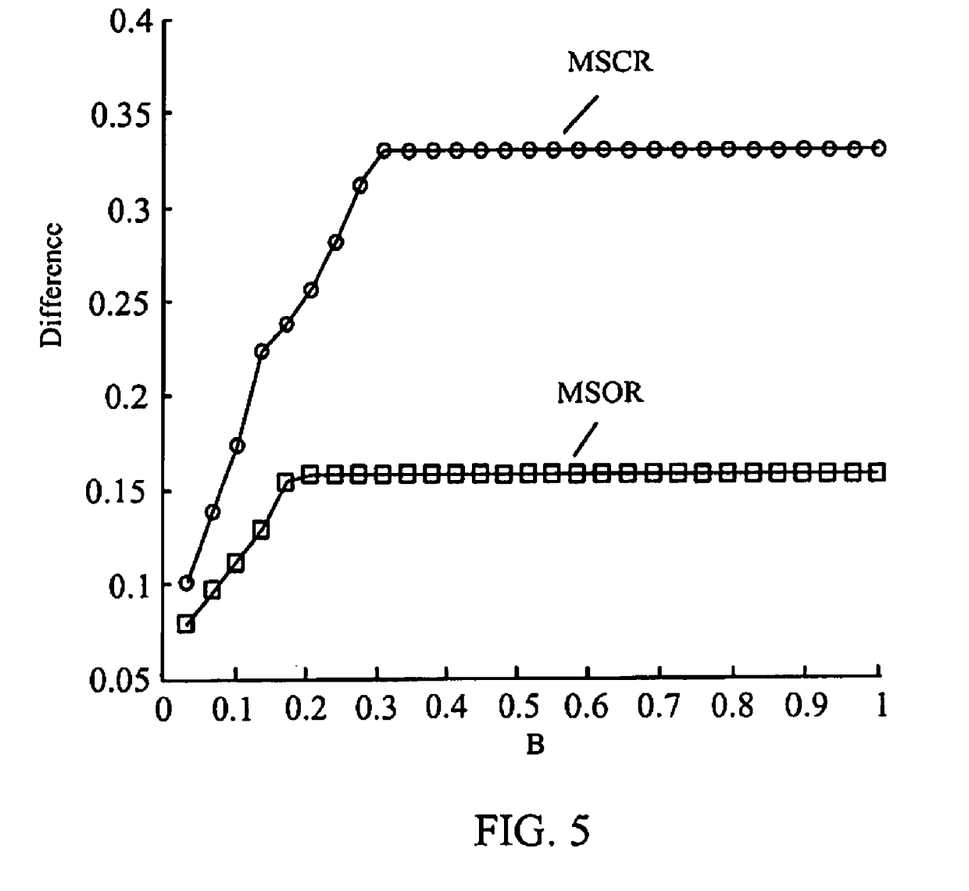
FIG. 5 depicts the relation between the difference and 3-D structure element B, where MSOR and MSCR curves are respectively for MSOR and MSCR operations.

In Step S402, the difference between all pixels in the original image I and an image, denoted as $I_B^{OR(t)}$, obtained by performing MSOR operation to the original image I, is represented as $$\Delta I_B^{OR(t)} = \sum_{x,y} |I(x, y) - I_B^{OR(t)}(x, y)| \quad (10)$$

where t is a scaling factor for changing the value of 3-D structure element. The relation between the difference $\Delta I_B^{OR}$ (t) and 3-D structure element B is depicted as MSOR curve in FIG. 5. Similarly, the difference between all pixels in the original image I and an image, denoted as $I_B^{CR(t)}$, obtained by performing MSCR operation to the original image I, is represented as $$\Delta I_B^{CR(t)} = \sum_{x,y} |I(x, y) - I_B^{CR(t)}(x, y)| \quad (11)$$

where t is a scaling factor for changing the value of 3-D structure element. The relation between the difference $\Delta I_B^{CR}$ (t) and 3-D structure element B is depicted as MSCR curve in FIG. 5.

For the MSOR curve, when increasing the value of 3-D structure element, the difference $\Delta I_B^{OR(t)}$ reaches to a constant. When 3-D structure element B is larger than a value $B_O$, the difference $\Delta I_B^{OR(t)}$ would approach constant. In the meanwhile, no change would occur after performing MSOR operation to the original image, i.e. $\Sigma_{x,y}|I_B^{OR(t)} - I_{B^+}^{OR(t)}|(x,y)|$ approaches zero. In other words, the slope of the MSOR curve approaches zero. As a result, $B_O$ is the 3-D modest structure element for MSOR operation. The ratio of $B_O$ to a predetermined structure element is 0.2 as shown in FIG. 5. Similarly, for the MSCR curve, $B_C$ is the 3-D modest structure element for MSCR operation. The ratio of $B_C$ to the predetermined structure element is 0.3 as shown in FIG. 5.

Figure 6:
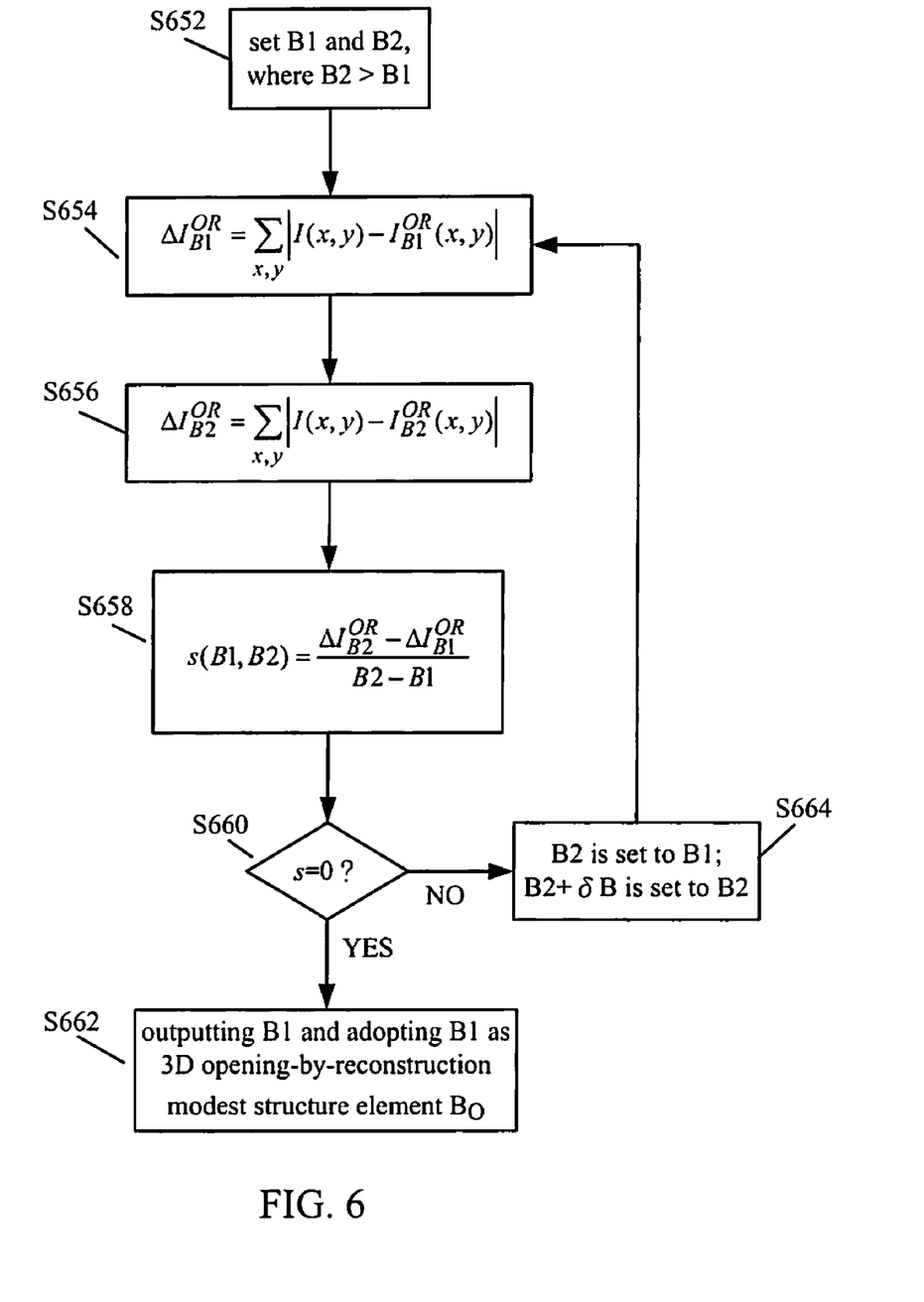
FIG. 6 is a flow chart showing an approach to determine a 3-D modest structure element according to the present invention.

Referring to FIG. 6, it will be described how to determine $B_O$ in Step S402, likewise for $B_C$.

In the beginning, the present invention sets two values of 3-D structure elements, B1 and B2, where B2>B1 (Step S652), and then calculate the difference between all pixels in the original image and an image obtained by performing MSOR operation to the original image by using B1, i.e.

$$\Delta I_{B1}^{OR} = \sum_{x,y} |I(x, y) - I_{B1}^{OR}(x, y)|$$

(Step S654), and the difference between all pixels in the original image and an image obtained by performing MSOR operation to the original image by using B2, i.e.

$$\Delta I_{B2}^{OR} = \sum_{x,y} |I(x, y) - I_{B2}^{OR}(x, y)|$$

(Step S656). The slope, $$s(B1, B2) = \frac{\Delta I_{B2}^{OR} - \Delta I_{B1}^{OR}}{B2 - B1},$$

is calculated (Step S658). If the slope approaches zero (Step S660), B1 is adopted as $B_O$, the opening-by-reconstruction 3-D modest structure element. Otherwise, B2 is increased and the increased value of B2 is set as a new value of B2; the original value of B2 is set as a new value of B1, i.e. B2+δB is set to B2 and original B2 is set to B1 (Step 664). For next proceeding, steps S654 to S658 are performed again by using the new values of B1 and B2. In addition, the original image can be resized to a small one and the resized original image is used to determine $B_O$ through steps S652 to S658. In this manner, it can reduce time for determining $B_O$. Similarly, it can also reduce time for determining $B_C$ by using the resized original image.

Figure 7:
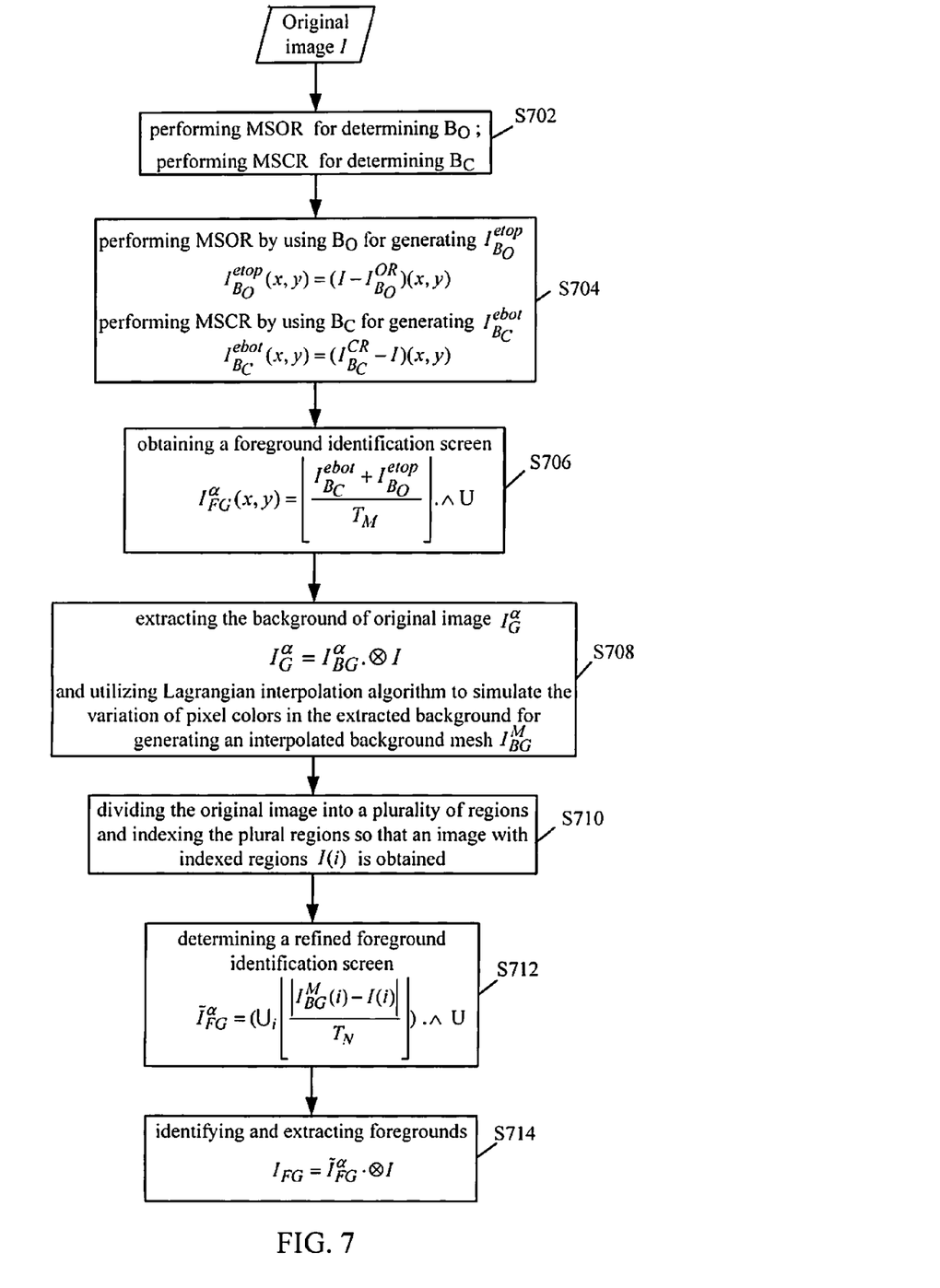
FIG. 7 is a flow chart illustrating a foreground identification method of the present invention in detail.

Please refer to FIG. 7 in conjunction with FIG. 4. The foreground identification method of the present invention will be described in detail later.

Step S702 corresponds to Step S402. Step S702 is similar to Step S402. For clarity and conciseness, the description of Step S702 will be omitted herein.

Step S704 corresponds to Step S404. In Step S704, to generate the enhanced top-hat image, each pixel in the original image subtracts corresponding pixel in the image obtained by performing MSOR operation to the original image by using $B_O$, represented as $$I_{B_o}^{etop}(x,y) = (I - I_{B_o}^{OR})(x,y) \quad (12)$$

where $I_{B_o}^{etop}$ is the enhanced top-hat image, $B_O$ is the 3-D opening-by-reconstruction modest structure element, and $I_{B_o}^{OR}$ is the image obtained by performing MSOR operation to the original image by using $B_O$. Similarly, the enhanced bottom-hat image is generated by the following equation:

$$I_{B_c}^{ebot}(x,y) = (I_{B_c}^{CR} - I)(x,y) \quad (13)$$

where $I_{B_c}^{ebot}$ is the enhanced bottom-hat image, $B_C$ is the 3-D closing-by-reconstruction modest structure element, and $I_{B_c}^{CR}$ is the image obtained by performing MSCR operation to the original image by using $B_C$.

Step S706 corresponds to Step S406. In Step S706, the overlap region between the enhanced top-hat image and the enhanced bottom-hat image is taken as the foreground identification screen. A two-value foreground identification screen (each pixel value is 1 or 0) is obtained by the following equation:

$$I_{FG}^{\alpha}(x, y) = \left\lfloor \frac{I_{B_C}^{CR} - I_{B_O}^{OR}}{T_M} \right\rfloor \cdot \wedge U = \left\lfloor \frac{I_{B_C}^{ebot} - I_{B_O}^{etop}}{T_M} \right\rfloor \cdot \wedge U \quad (14)$$

where $I_{FG}^{\alpha}$ is the foreground identification screen, $I_{FG}^{\alpha}(x,y) \in \{0,1\}$, $I_{B_c}^{etop}$ is the enhanced top-hat image, $I_{B_c}^{ebot}$ is the enhanced bottom-hat image, $\bullet \wedge$ is an element by element logic AND operation between image matrix $\lfloor \bullet \rfloor$ and a unit matrix U with the same dimension, and $T_M$ is a threshold for identifying homogeneous areas. The threshold $T_M$ can be a predetermined value or can be determined by the result of foregrounds extracted by the foreground identification screen, which is calculated from equation (14).

Step S708 corresponds to Step S408. In Step S708, the foreground identification screen obtained from Step S706 is transformed into a background identification screen. The background of original image is extracted by utilizing the background identification screen. After that, an interpolated background mesh is generated by utilizing conventional Lagrangian interpolation algorithm to simulate the variation of pixel colors in the extracted background. Utilizing the background identification screen to extract the background of original image is represented as $$I_G^{\alpha} = I_{BG}^{\alpha} \bullet \otimes I \quad (15)$$

where $I_G^{\alpha}$ is the extracted background, $I_G^{\alpha}(x,y) \in \{0, 1, \ldots, 2^n-1\}$, $I_{BG}^{\alpha}$ is the background identification screen, and the operation symbol $\bullet \otimes$ denotes element by element multiplications.

Step S710 corresponds to Step S410. In Step S710, conventional JSEG (J measure based segmentation) algorithm can be utilized for dividing the original image into arbitrary shaped regions.

Step S712 corresponds to Step S412. In Step S712, the refined foreground identification screen determined according to a refinement calculation is represented as $$\tilde{I}_{FG}^{\alpha} = \left( U_i \left\lfloor \frac{|I_{BG}^M(i) - I(i)|}{T_N} \right\rfloor \right) \cdot \wedge U \quad (16)$$

where $\tilde{I}_{FG}^{\alpha}$ is the refined foreground identification screen, $I(i)$ is an i-th region in the original image, $I_{BG}^M(i)$ is a corresponding i-th region in the interpolated background mesh, $U_i$ is a union operation for sets of image pixels in the i-th region, $\bullet \wedge$ is an element by element logical AND operation between image matrix $\lfloor \bullet \rfloor$ and a unit matrix U with the same dimension, and $T_N$ is a threshold to determine whether one region-map unit, $I(i)$, in I is close enough to the corresponding region in $I_{BG}^M(i)$ or not. The threshold $T_N$ can be a predetermined value or can be determined by the result of foregrounds extracted by the refined foreground identification screen, which is calculated from equation (16).

Step S714 corresponds to Step S414. In Step S714, to identify and extract foregrounds from the original image, each pixel in the original image multiples corresponding pixel in the refined foreground identification screen, represented as $$I_{FG} = \tilde{I}_{FG}^{\alpha} \bullet \otimes I \quad (17)$$

where $I_{FG}$ is the foregrounds extracted from the original image, $\tilde{I}_{FG}^{\alpha}$ is the refined foreground identification screen, and the operation symbol $\bullet \otimes$ denotes element by element multiplications.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A foreground identification method, comprising steps of:
    (a) respectively performing MSOR and MSCR operations to an original image by using plural values of 3-D structure element for determining a 3-D opening-by-reconstruction modest structure element and a 3-D modest closing-by-reconstruction structure element;
    (b) comparing the original image and an image obtained by performing MSOR operation with the 3-D opening-by-reconstruction modest structure element to the original image so as to generate an enhanced top-hat image, and comparing the original image and an image obtained by performing MSCR operation with the 3-D modest closing-by-reconstruction structure element to the original image so as to generate an enhanced bottom-hat image;
    (c) locating an overlap region between the enhanced top-hat image and the enhanced bottom-hat image, where the overlap region forms a foreground identification screen;
    (d) simulating the variation of pixel colors in background areas extracted by the foreground identification screen for generating an interpolated background mesh;
    (e) dividing the original image into a plurality of regions and indexing the plural regions so that an image with indexed regions is obtained;
    (f) comparing the interpolated background mesh and the image with indexed regions for determining a refined foreground identification screen according to a refinement calculation; and
    (g) identifying and extracting foregrounds from the original image by utilizing the refined foreground identification screen.

2. The foreground identification method of claim 1, wherein the step (a) of determining the 3-D opening-by-reconstruction modest structure element comprises sub-steps of:
    (a1) setting a first structure element with a first value and a second structure element with a second value, where the second value is larger than the first value;
    (a2) calculating the difference between all pixels in the original image and an image obtained by performing MSOR operation to the original image by using the first structure element, for obtaining a first difference value;
    (a3) calculating the difference between all pixels in the original image and an image obtained by performing MSOR operation to the original image by using the second structure element, for obtaining a second difference value;

(a4) dividing the difference between the first difference value and the second difference value by the difference between the first structure element and the second structure element, for obtaining a slope; and (a5) adopting the first structure element as the 3-D opening-by-reconstruction modest structure element if the slope is substantially equal to zero, otherwise, increasing the second value and setting the increased second value as a new value of the second structure element, setting the original second value as a new value of the first structure element, and repeating the steps (a2) to (a4) by using the new values of the first and the second structure elements.

3. The foreground identification method of claim 2, wherein the original image is resized to a small one and the resized original image is used to determine the 3-D opening-by-reconstruction modest structure element through the steps (a1) to (a5).

4. The foreground identification method of claim 2, wherein MSOR operation is represented as $$I_B^{OR} = (I \tilde{\circ} nB) = \delta_B^{m+1}(I \circ nB, I) = \min(\delta_B^m(I \circ nB, I)[+]nB, I)$$

where I is the original image, B is the 3-D structure element, $I \circ B = (I[-]B)[+]B$ is a morphological opening operation, $$I \cdot nB = \{(I\underbrace{[-]B)[-]B \ldots [-]B}_{n\ times}\}\underbrace{[+]B[+]B \ldots [+]B}_{n\ times}$$

is a multi-scale opening operation, n is an integer, represented as a scaling factor, m is also an integer, represented the number of times that reconstruction is to be performed, and $\delta_B^1 = \min((I \circ nB)[+]nB, I)$.

5. The foreground identification method of claim 1, wherein MSCR operation is represented as $$I_B^{CR} = (I \tilde{\bullet} nB) = \epsilon_B^{m+1}(I \bullet nB, I) = \max(\epsilon_B^m(I \bullet nB, I)[-]nB, I)$$

where I is the original image, B is the 3-D structure element, $I \bullet B (I[+]B)[-]B$ is a morphological closing operation, $$I \cdot nB = \{(I\underbrace{[+]B)[+]B \ldots [+]B}_{n\ times}\}\underbrace{[-]B[-]B \ldots [-]B}_{n\ times}$$

is a multi-scale closing operation, n is an integer, represented as a scaling factor, m is also an integer, represented the number of times that reconstruction is to be performed, and $\epsilon_B^1 = \max((I \bullet nB)[-]nB, I)$.

6. The foreground identification method of claim 1, wherein each pixel in the original image subtracts corresponding pixel in the image obtained by performing MSOR operation to the original image by using the 3-D opening-by-reconstruction modest structure element, for generating the enhanced top-hat image.

7. The foreground identification method of claim 1, wherein each pixel in the image obtained by performing MSCR operation to the original image by using the 3-D closing-by-reconstruction modest structure element, subtracts corresponding pixel in the original image, for generating the enhanced bottom-hat image.

8. The foreground identification method of claim 1, wherein the foreground identification screen is the overlap region between the enhanced top-hat image and the enhanced bottom-hat image, represented as $$I_{FG}^\alpha(x,y) = \left\lfloor \frac{I_{B_C}^{CR} - I_{B_O}^{OR}}{T_M} \right\rfloor \cdot \wedge U = \left\lfloor \frac{I_{B_C}^{ebot} - I_{B_O}^{etop}}{T_M} \right\rfloor \cdot \wedge U$$

where $I_{FG}^\alpha$ is the foreground identification screen, $I_{FG}^\alpha(x,y) \in \{0,1\}$, $I_{B_p}^{etop}$ is the enhanced top-hat image, $I_{B_c}^{ebot}$ is the enhanced bottom-hat image, $T_M$ is a threshold for identifying homogeneous areas, and $\bullet\wedge$ is an element by element logic AND operation between image matrix $\lfloor\bullet\rfloor$ and a unit matrix U with the same dimension.

9. The foreground identification method of claim 1, wherein the background of original image extracted by the foreground identification screen is represented as $$I_G^\alpha = I_{BG}^\alpha \bullet \otimes I$$

where I is the original image, $I_G^\alpha$ is the extracted background, $I_G^\alpha(x,y) \in \{0, 1, \ldots, 2^n-1\}$, $I_{BG}^\alpha$ is a background identification screen derived from the foreground identification screen $I_{FG}^\alpha$ by two-value transformation (i.e. when a pixel value of $I_{FG}^\alpha$ is "1", a corresponding pixel value of $I_{BG}^\alpha$ is "0"; when the pixel value of $I_{BG}^\alpha$ is "0", the corresponding pixel value of $I_{FG}^\alpha$ is "1"), and operation symbol $\bullet\otimes$ denotes element by element multiplications.

10. The foreground identification method of claim 9, wherein the interpolated background mesh is generated by utilizing Lagrangian interpolation algorithm to simulate the variation of pixel colors in the extracted background $I_G^\alpha$.

11. The foreground identification method of claim 2, wherein the refined foreground identification screen determined according to the refinement calculation is represented as $$\tilde{I}_{FG}^\alpha = \left( U_i \left\lfloor \frac{|I_{BG}^M(i) - I(i)|}{T_N} \right\rfloor \right) \cdot \wedge U$$

where $\tilde{I}_{FG}^\alpha$ is the refined foreground identification screen, I(i) is an i-th region in the original image, $I_{BG}^M(i)$ is a corresponding i-th region in the interpolated background mesh, $U_i$ is a union operation for sets of image pixels in the i-th region, $\bullet\wedge$ is an element by element logical AND operation between image matrix $\lfloor\bullet\rfloor$ and a unit matrix U with the same dimension, and $T_N$ is a threshold to determine whether one region-map unit, I(i), in I is close enough to the corresponding region in $I_{BG}^M(i)$ or not.

12. The foreground identification method of claim 1, wherein in the step (g), identifying and extracting foregrounds from the original image is represented as $$I_{FG} = \tilde{I}_{FG}^\alpha \bullet \otimes I \qquad (17)$$

where I is the original image, $I_{FG}$ is the foregrounds extracted from the original image, $\tilde{I}_{FG}^\alpha$ is the refined foreground identification screen, and operation symbol $\bullet\otimes$ denotes element by element multiplications.

* * * * *